United States Patent [19]

Mueller

[11] Patent Number: 4,789,172
[45] Date of Patent: Dec. 6, 1988

[54] BICYCLE SEAT POST CLAMP MECHANISM

[75] Inventor: Cliffod F. Mueller, Arlington Heights, Ill.

[73] Assignee: Schwinn Bicycle Company, Chicago, Ill.

[21] Appl. No.: 129,464

[22] Filed: Dec. 7, 1987

[51] Int. Cl.$^4$ ............................................. B62K 19/36
[52] U.S. Cl. .................................. 280/281 R; 297/195
[58] Field of Search ................... 280/220, 226 R, 274, 280/281 R, 283, 287; 297/195, 214; 403/104, 344, 367, 370, 371, 373, 374

[56] References Cited

U.S. PATENT DOCUMENTS

| | | | |
|---|---|---|---|
| 578,011 | 3/1897 | Girardet | 280/287 |
| 2,770,479 | 11/1956 | Hilber | 280/281 R |
| 3,998,563 | 12/1976 | Kloren | 403/370 |
| 4,120,512 | 10/1978 | Newlands | 297/195 |
| 4,128,355 | 12/1978 | Leaf | 403/344 |
| 4,134,703 | 1/1979 | Hinners | 403/374 |

FOREIGN PATENT DOCUMENTS 2550153  2/1985  France ................... 297/195
690201  10/1979  U.S.S.R. ................. 403/344

Primary Examiner—David M. Mitchell
Assistant Examiner—Everett G. Diederiks, Jr.
Attorney, Agent, or Firm—McCaleb, Lucas & Brugman

[57] ABSTRACT

Bicycle seat post clamp mechanism comprising a locking shoe supported in a seat stay tube for movement to and from a locking position engaging the seat post. The locking shoe has a pair of beveled rear cam faces and a rear extension with a through hole. A pair of clamp members, each with a through hole and a beveled cam face, are supported in diametrically spaced circular openings in the wall of the seat stay tube, and extend along a horizontal axis transverse to the seat post. An adjusting screw extends through the clamp members. Tightening the screw draws the clamp members together causing the cam faces to move the locking shoe forwardly into its locking position against the seat post. The locking shoe and clamp members have circular cross-sections of a size small enough to be inserted through the openings in the seat stay tube and then to be assembled therein.

5 Claims, 2 Drawing Sheets

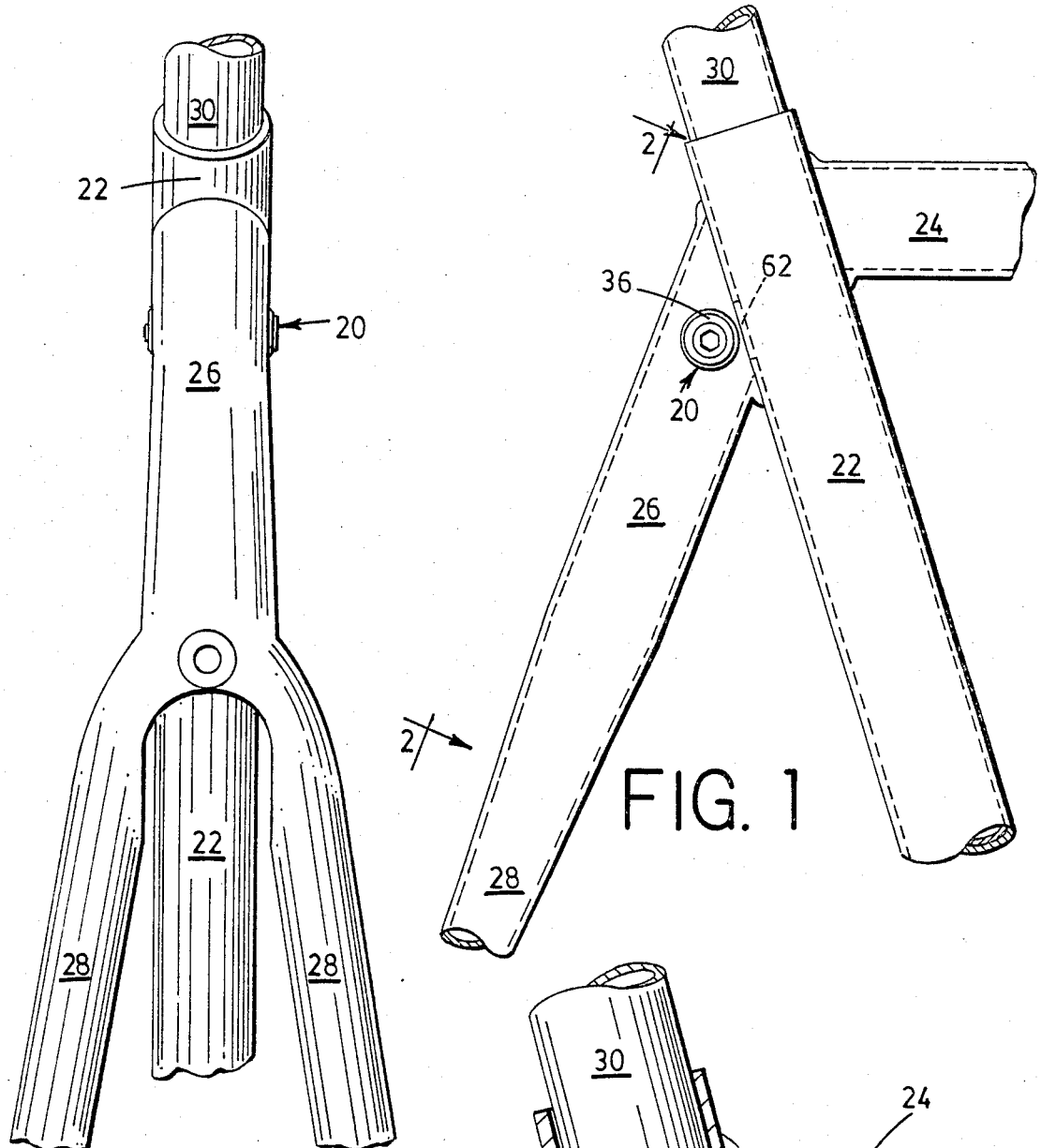

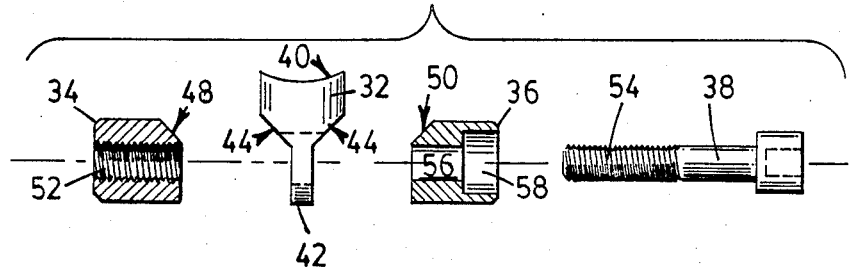
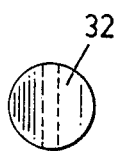
FIG. 9
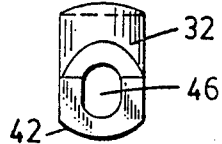
FIG. 10
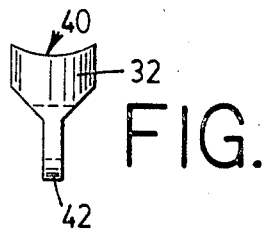
FIG. 7
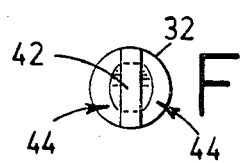
FIG. 8

BICYCLE SEAT POST CLAMP MECHANISM

BACKGROUND OF THE INVENTION

Bicycle saddle is mounted on a seat post which is telescopically fitted within a seat tube extending upwardly from the bottom bracket which journals the pedal crank. Conventionally, the top end of the seat tube is split on the backside and it has a heavy U-shaped collar with a long seat clamp bolt which can be tightened to grip the seat post and hold the saddle at a preferred height.

These conventional clamps and the bolts and bolt tightening levers often used with them, are unattractive, and involve external components which take up scarce room beneath the seat.

Applicant is aware of at least one attempt to provide a seat post mechanism which was wholly contained within the frame tubing, without any of the conventional external components, but this involved wedging high angle cam surfaces directly against the seat post, causing it to stick when the cam surfaces would not release.

SUMMARY OF THE INVENTION

It is a general object of the present invention to provide a bicycle seat post clamp mechanism which is wholly contained within one of the frame tubes, is free of sticking, and is completely reliable.

A particular object is to provide a bicycle-type seat post clamp mechanism with a locking shoe supported in a seat stay tube for movement to and from a locking position engaging the seat post, an adjustment screw rotatably supported in the seat stay tube along an axis normal to a radius of the seat post, and cam members acting between the adjusting screw and the locking shoe for moving the latter to its locking position.

Another object is to provide such a clamp mechanism in which separate cam members flank the locking shoe and are simultaneously moveable by the adjustment screw into engagement with opposite sides of the locking shoe.

Another object is to provide such a clamp mechanism in which the adjustment screw is oriented transversely to the seat post and is supported within diametrically opposed openings in the wall of the seat stay tube.

Another object is to provide such a clamp mechanism in which a pair of clamp members are supported in a seat stay tube for movement relative to one another and relative to the locking shoe, and mutually engageable camming surfaces are provided on the clamp members and on the locking shoe for moving the latter into its locking position in response to movement of the clamp members by the adjustment screw.

Another object is to provide such a clamp mechanism in which the clamp members are aligned for movement along the axis of the adjusting screw and are supported within diametrically opposed openings in the wall of the seat stay tube.

Another object is to provide such a clamp mechanism in which the clamp members and locking shoe have cross-sections small enough to permit insertion and assembly through the openings in the wall of the seat stay tube.

Another object is to provide such a clamp mechanism in which the openings, clamp members, and locking shoe have circular cross-sections.

Another object is to provide such a clamp mechanism in which the locking shoe has a forward concave face complementing the outer surface of the seat post, and has a rearward extension with a through-hole receiving the adjusting screw when the components are assembled.

Another object is to provide such a clamp mechanism in which the mutually engageable camming surfaces comprise a pair of beveled cam surfaces at the rear of the locking shoe, and complementary cam surfaces on the clamp members.

BRIEF DESCRIPTION OF THE DRAWINGS

Other objects and advantages will be apparent from the following description taken in connection with the drawings in which FIG. 1 is a fragmentary right side view of a bicycle frame fitted with a seat post clamp mechanism embodying the present invention;

FIG. 2 is a rear view of FIG. 1;

FIG. 3 is a fragmentary, enlarged, partially sectioned view of FIG. 1;

FIG. 4 is a cross-sectional view of FIG. 3 taken along the line 4—4;

FIG. 5 is a fragmentary view of FIG. 4 taken in the direction of the arrows 5—5;

FIG. 6 is an exploded view of the locking shoe, clamp members, and adjusting screw comprising major components of the present invention;

FIG. 7 is a top view of the locking shoe, essentially duplicating the view of the locking shoe shown in FIG. 6;

FIG. 8 is a rear view of FIG. 7;

FIG. 9 is a front view of FIG. 7; and

FIG. 10 is a left hand, elevational view of FIG. 7.

Like parts are referred to by like reference characters.

DESCRIPTION OF THE PREFERRED EMBODIMENT

Referring now to the specific embodiment of the invention shown in the drawings, the seat post clamp mechanism is generally designated 20 and is shown assembled in a bicycle frame which is partially illustrated and includes a rearwardly and upwardly inclined seat tube 22, a horizontal top tube 24, and a downwardly and rearwardly inclined seat stay tube 26 with forked downward extensions 28,28. A seat post 30 is telescopically mounted in the usual way for up and down adjustable movement in the seat tube for the purpose of varying the elevation of the saddle (not shown).

The seat post clamp mechanism 20 compriss a locking shoe 32, a pair of clamp members 34 and 36, and an adjustment screw 38.

As shown in FIGS. 8 and 9, the locking shoe 32 is circular in cross-section. It has a forward, cylindrically concave surface 40 complementing the surface of seat post 30 (as shown in FIG. 4), and a relatively narrow rear extension 42, with a pair of intermediate beveled cam surfaces 44,44 on opposite sides. As best shown in FIG. 10, there is a slightly horizontally-elongated opening 46 through the extension 42.

The clamp members 34 and 36 have round cross-sections as shown in FIGS. 1 and 5. They have beveled cam surfaces 48 and 50 respectively engageable with beveled cam surfaces 44,44 on the locking shoe. Clamp member 34 is internally threaded at 52 to engage the threaded end 54 of adjustment screw 38. Clamp member 36 has a bore 56 and a counterbore 58 to fit the head end of the adjusting screw.

To assemble the clamp mechanism, the components are inserted through one of the openings 60 in the seat stay tube 26 and the forward face 40 of the locking shoe will be inserted through the opening 62 in the seat tube 22. To enable assembly, the openings 60,60 must be large enough to permit the locking shoe and clamp members to pass through them, and opening 62 must be large enough for the locking shoe to fit within it.

As shown in the assembly view of FIG. 4, the locking shoe 32 is moveable along a line x—x, normal to the surface of the seat post 30, to and from a locking position against the seat post. This movement of the locking shoe directly toward and away from the seat post surface, instead of wedgingly transverse thereto, is an important feature of the invention because it prevents sticking and enables positive and reliable loosening of the seat post. The adjustment screw 38 and cam members 34,36, are supported along an axis y—y which is normal to line x—x. To hold the assembly stable in the locked position, the opening 62 in the seat tube 30 should be only slightly larger than the cross-section of the locking shoe; and openings 60,60 in the seat stay tube should he only slightly larger than the cross-section of the clamping members 34,36.

Use and operation is believed to be apparent from the above description. Briefly, tightening the screw 38 by means of an Allen Head wrench inserted in the head end, draws the cam members together, forcing the beveled cam surfaces 48,50 of cam members 34,36 against the opposite beveled cam faces 44,44 on the locking shoe 32, causing the shoe to displace forwardly into frictional griping engagement with the seat post as shown in FIG. 4. Loosening the adjustment screw releases the grip, enabling the seat post to be adjusted up or down to a new level.

The embodiment described and shown to illustrate the present invention has been necessarily specific for purposes of illustration. Alterations, extensions, and modifications would be apparent to those skilled in the art. The aim of the apended claim, therefore, is to cover all variations included within the spirit and scope of the invention.

The embodiments of the invention in which an exclusive property or privilege is claimed are defined as follows:

1. In a bicycle having a frame including a seat tube, a second tube connected to the rear upper end portion of the seat tube, a seat post telescopically mounted for up and down adjustable movement in the seat tube, improved seat post clamp mechanism comprising:
   (a) a locking shoe supported in the second tube for movement to and from a locking position engaging the seat post;
   (b) a pair of clamp members supported in said second tube and aligned for movement relative to one another and to the locking shoe along an axis transverse to the seat post, said clamp members being supported within diametrically opposed openings in the wall of the second tube to thereby absorb clamping reactive forces in a direction tangential to that wall;
   (c) mutually engageable camming surfaces on the clamp members and on the locking shoe for moving the locking shoe into its locking position in response to relative movement of the clamp members; and
   (d) adjustment means for effecting relative movement of the clamp members to selectively engage and disengage the camming surfaces on the clamp members and the locking shoe.

2. In a bicycle seat post clamp mechanism, the combination of claim 1 in which:
   the clamp members and locking shoe have cross-sections small enough to permit insertion through the openings for assembly within the second tube.

3. In a bicycle seat post clamp mechanism, the combination of claim 2 in which:
   the openings, clamp members, and locking shoe have circular cross-sections.

4. In a bicycle seat post clamp mechanism, the combination of claim 1 in which:
   the locking shoe has a forward concave face complementing the outer surface of the seat post, and a rearward extension having a through hole therein;
   each clamp member having a through hole therein, at least one of which is threaded; and
   said adjustment means comprising an adjustment screw extending through the through holes in the locking shoe and clamp members.

5. In a bicycle seat post clamp mechanism, the combination of claim 4 in which:
   the mutually engageable camming surfaces comprise a pair of beveled first cam surfaces at the rear of the locking shoe, and a complementary second cam surface on each clamp member.

* * * * *

UNITED STATES PATENT AND TRADEMARK OFFICE
CERTIFICATE OF CORRECTION

PATENT NO. : 4,789,172

DATED : December 6, 1988

INVENTOR(S) : Clifford F. Mueller

It is certified that error appears in the above-identified patent and that said Letters Patent is hereby corrected as shown below:

Name of Inventor should read "Clifford F. Mueller".

Signed and Sealed this

Thirtieth Day of May, 1989

Attest:

DONALD J. QUIGG

Attesting Officer

Commissioner of Patents and Trademarks